United States Patent
Jones

(10) Patent No.: US 10,712,563 B2
(45) Date of Patent: Jul. 14, 2020

(54) METHODS FOR NEAR-TO-EYE DISPLAYS EXPLOITING OPTICAL FOCUS AND DEPTH INFORMATION EXTRACTION

(71) Applicant: ESIGHT CORP., Ottawa (CA)

(72) Inventor: Frank Jones, Carp (CA)

(73) Assignee: ESIGHT CORP., Ottawa (CA)

( * ) Notice: Subject to any disclaimer, the term of this patent is extended or adjusted under 35 U.S.C. 154(b) by 0 days.

(21) Appl. No.: 15/766,023

(22) PCT Filed: Oct. 4, 2016

(86) PCT No.: PCT/CA2016/000248
§ 371 (c)(1),
(2) Date: Apr. 5, 2018

(87) PCT Pub. No.: WO2017/059522
PCT Pub. Date: Apr. 13, 2017

(65) Prior Publication Data
US 2018/0284437 A1  Oct. 4, 2018

Related U.S. Application Data

(60) Provisional application No. 62/237,141, filed on Oct. 5, 2015.

(51) Int. Cl.
  *G06T 15/00*  (2011.01)
  *G09G 5/00*  (2006.01)
  (Continued)

(52) U.S. Cl.
  CPC ....... *G02B 27/017* (2013.01); *G02B 27/0093* (2013.01); *G06T 19/006* (2013.01);
  (Continued)

(58) Field of Classification Search
  None
  See application file for complete search history.

(56) References Cited

U.S. PATENT DOCUMENTS

2011/0032252 A1* 2/2011 Ohta ..................... G09G 3/003
                                                       345/419
2012/0206452 A1* 8/2012 Geisner ................ G02B 27/017
                                                       345/419
(Continued)

Primary Examiner — Carl Adams
(74) Attorney, Agent, or Firm — Rosenberg, Klein & Lee

(57) ABSTRACT

Near-to-eye displays allow a user to be presented with images that are either augmented to address defects or aberrations within their vision or provide additional information. However, an acquired image typically contains content at different depths and absent depth information image processing applied to the acquired image may discount or apply an image modification that reduces visibility of an object. Accordingly, it would be beneficial for such near-to-eye displays to exploit depth information within the image processing and/or generate depth maps allowing images presented to the user to account for depth. It would be further beneficial for such enhancements to be compatible with the evolving low weight, low volume, low complexity, and low cost near-to-eye display systems. It would be further beneficial to provide a user with other non-visual stimuli based upon depth information within the image.

21 Claims, 8 Drawing Sheets

(51) Int. Cl.
*G02B 27/01* (2006.01)
*G09B 21/00* (2006.01)
*G02B 27/00* (2006.01)
*G06T 19/00* (2011.01)

(52) U.S. Cl.
CPC ...... *G09B 21/008* (2013.01); *G02B 2027/014* (2013.01); *G02B 2027/0138* (2013.01)

(56) References Cited

U.S. PATENT DOCUMENTS

2014/0132485 A1\* 5/2014 Kim .................. G02B 27/0172
345/8
2016/0343173 A1\* 11/2016 Mullins .................. G06F 3/011

\* cited by examiner

METHODS FOR NEAR-TO-EYE DISPLAYS EXPLOITING OPTICAL FOCUS AND DEPTH INFORMATION EXTRACTION

CROSS-REFERENCE TO RELATED APPLICATIONS

This specification claims the benefit of priority as 371 National Phase Entry application of PCT/CA2016/000,248 filed Oct. 4, 2016 entitled "Methods for Near-to-Eye Displays Exploiting Optical Focus and Depth Information Extraction", which itself claims the benefit of priority from U.S. Provisional Patent Application 62/237,141 filed Oct. 5, 2015 entitled "Methods and Devices for Optical Focus and Depth Information Extraction", the entire contents of each being incorporated herein by reference.

FIELD OF THE INVENTION

This invention relates to near-to-eye systems and more particularly to methods and devices for obtaining depth information in an image to focus or enhance an image or provide other sensory feedback to users based upon depth information within the image and depth maps of the environment of the user.

BACKGROUND OF THE INVENTION

A near-to-eye (or near-eye) display is a wearable device that creates a display in front of the user's field of vision. The display may be transparent or opaque, depending on the application. For example, a transparent display can overlay information and graphics on top on the real world, while an opaque display can provide an immersive theater-like experience.

Near-to-eye Displays can be broadly placed in two categories, immersive and see-through. Immersive near-to-eye displays block a user's view of the real world and create a large field of view image, typically 30°-60° degrees for cinema glasses and 90°+ degrees for virtual reality displays. See-through near-to-eye displays leave the user's view of the real world open and create either a transparent image or a very small opaque image that blocks only a small portion of the user's peripheral vision. The see-through category can be broken down into two applications, augmented reality and smart glasses. Augmented reality headsets typically offer 20°-60° degree fields of view and overlay information and graphics on top of the user's view of the real world. Smart glasses, which is really a misnomer, in contrast typically have a smaller field of view and a display at which the user glances periodically rather than looking through the display continuously.

It would be beneficial for such near-to-eye displays to exploit image content based upon depth information within the image and/or generate depth maps of the environment of the user allowing images presented to the user to enhance the user's visual stimuli. It would be further beneficial for such enhancements to be compatible with the evolving low weight, low volume, low complexity, and low cost near-to-eye display systems can be provided to users, both with normal vision or with low-vision. It would be further beneficial to provide a user with other non-visual stimuli based upon depth information within the image.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to near-to-eye systems and more particularly to methods and devices for obtaining depth information in an image to focus or enhance an image or provide other sensory feedback to users based upon depth information within the image and depth maps of the environment of the user.

In accordance with an embodiment of the invention there is provided a method of providing a user of a head mounted display system with an image comprising the step of defining a depth map for a plurality of regions within an acquired digital image based upon processing the acquired image data within the plurality of regions to establish defocusing data and deriving a depth in dependence upon the defocusing data.

In accordance with an embodiment of the invention there is provided a method comprising:
using a defocus statistic for each region of an image which is calculated based on a characterization of the given lens and camera system;
providing a user of a head mounted display system with an image comprising the step of defining a depth map for a plurality of regions by deriving a depth in dependence upon the defocusing data, wherein In accordance with an embodiment of the invention there is provided a method of providing a user of a head mounted display system an image comprising:
rapidly capturing with a camera associated with the user a plurality of acquired images, each acquired image within the plurality of acquired images being defocused relative to the focal plane of a sensor within the camera by a different amount;
processing the plurality of acquired images to establish a presentation image with unlimited depth of field for presentation to the user.

In accordance with an embodiment of the invention there is provided a method of providing a user of a head mounted display system an image comprising:
rapidly capturing with a camera associated with the user a plurality of acquired images, each acquired image within the plurality of acquired images being defocused relative to the focal plane of a sensor within the camera by a different amount;
processing the plurality of acquired images to establish a presentation image for presentation to the user, wherein processing the plurality of acquired images comprises:
defining within each acquired image regions having a defocusing below a predetermined threshold; and
composing the presentation image for presentation from the images regions in each image having the defocusing below a predetermined threshold.

In accordance with an embodiment of the invention there is provided a method of providing a user of a head mounted display system an image comprising:
rapidly capturing with a camera associated with the user a plurality of acquired images, each acquired image within the plurality of acquired images being defocused relative to the focal plane of a sensor within the camera by a different amount;
processing the plurality of acquired images to establish a presentation image for presentation to the user, wherein processing the plurality of acquired images comprises:
generating for each acquired image a first modified image comprising only the low frequency content of the acquired image;
generating for each acquired image a second modified image based upon subtracting the first modified image from the acquired image;
composing the presentation image for presentation from the plurality of acquired images based upon selecting the content within them associated with those regions within the plurality of second images having the highest value.

In accordance with an embodiment of the invention there is provided a method of providing a user of a head mounted display system an image comprising:
rapidly capturing with a camera associated with the user a plurality of acquired images, each acquired image within the plurality of acquired images being defocused relative to the focal plane of a sensor within the camera by a different amount;
processing the plurality of acquired images to establish a presentation image for presentation to the user, wherein processing the plurality of acquired images comprises:
establishing a grid defining a plurality of regions for each acquired image in the plurality of acquired images;
processing the plurality of acquired images to define a defocusing error within each region of the plurality of regions for each acquired image of the plurality of acquired images;
defining for each region of the plurality of regions the acquired image of the plurality of acquired images having the lowest defocusing error;
composing a presentation image for presentation to the user by selecting for each region within the plurality of regions the image content from the acquired image of the plurality of acquired images having the lowest defocusing error.

In accordance with an embodiment of the invention there is provided a method of providing a user of a head mounted display system an image comprising modifying a predetermined portion of an acquired image in dependence upon a depth map of the acquired image.

In accordance with an embodiment of the invention there is provided a method of providing a user of a head mounted display system with information comprising:
establishing a depth map for an image to be or being presented to a user;
processing the image to be or being presented to the user in dependence upon the depth map; and
generating an output in dependence upon the processed image which is not visually presented to the user by modifying the image.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
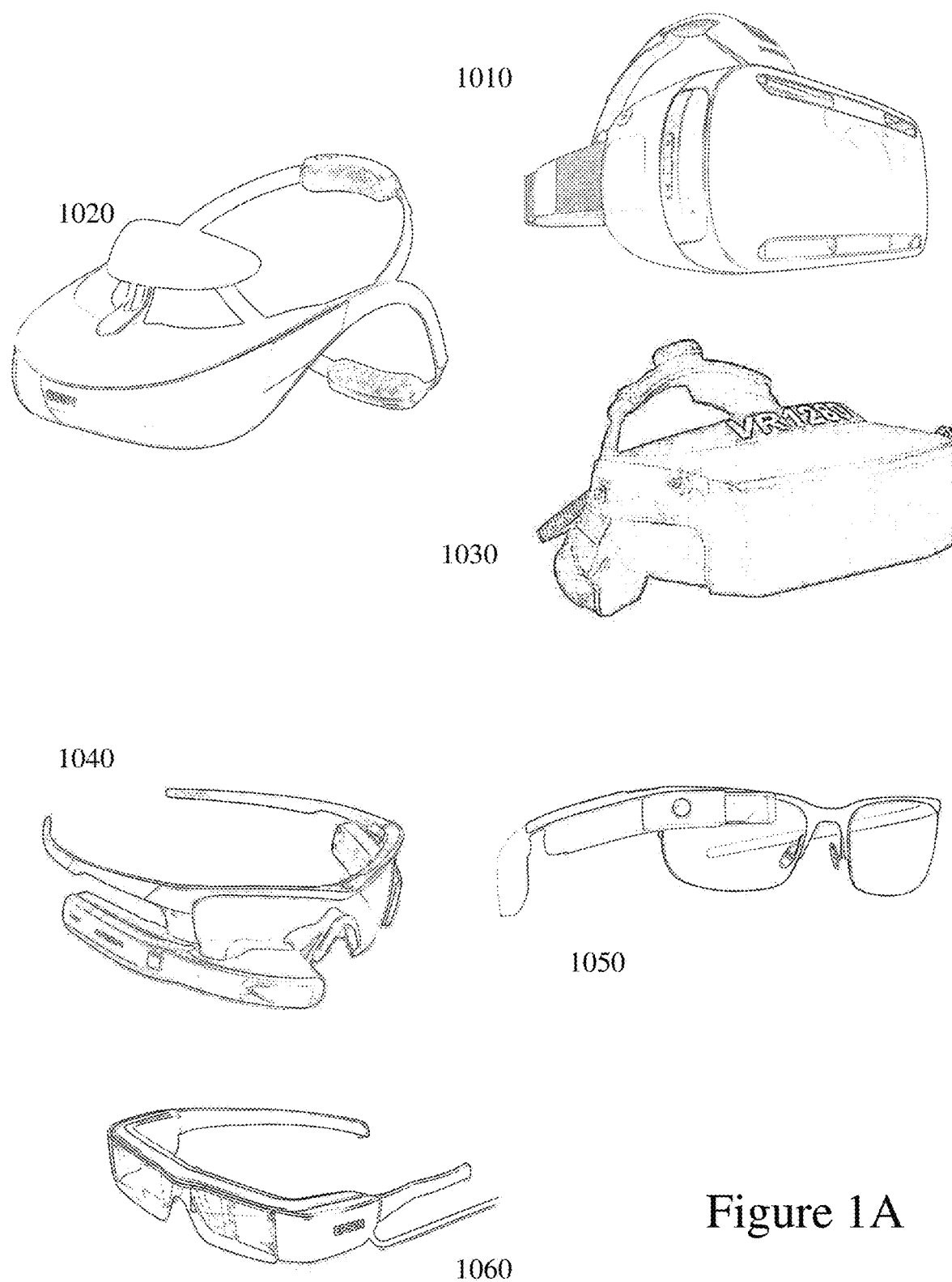
FIG. 1A depicts prior art immersive and augmented reality head mounted displays (HMDs)

The present invention relates to near-to-eye systems and more particularly to methods and devices for obtaining depth information in an image to focus or enhance an image or provide other sensory feedback to users based upon depth information within the image and depth maps of the environment of the user.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "head mounted display" (HMD) or near-to-eye (NR2I) display as used herein and throughout this disclosure refers to a wearable device that incorporates an image capturing device and an image presentation device operating in conjunction with a microprocessor such that a predetermined portion of an image captured by the image capturing device is presented to the user on the image presentation device. Alternatively, in some cases, the source of the image for display to the wearer of the HMD may come from a remotely attached camera, a portable electronic device, a fixed electronic device or any video source. The microprocessor and any associated electronics including, but not limited to, memory, user input device, gaze tracking, context determination, graphics processor, and multimedia content generator may be integrated for example with the HMD, form part of an overall assembly with the HMD, form part of the PED, or as discrete unit wirelessly connected to the HMD and/or PED.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

"User information" as used herein may refer to, but is not limited to, user behavior information and/or user profile information. It may also include a user's biometric/biomedical information, an estimation of the user's biometric/biomedical information, or a projection/prediction of a user's biometric/biomedical information derived from current and/or historical biometric/biomedical information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, environmental sensors, medical sensors, biological sensors, physiological sensors, chemical sensors, ambient environment sensors, position sensors, and motion sensors.

"Biometric" or "biomedical" information as used herein may refer to, but is not limited to, data relating to a user characterised by data relating to a subset of conditions including, but not limited to, their eyesight, biological condition, physiological condition, ambient environment condition, position condition, neurological condition, drug condition, and one or more specific aspects of one or more of these said conditions.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "wearer", "user" or "patient" as used herein and through this disclosure refers to, but is not limited to, a person or individual who uses the HMD either as a patient requiring visual augmentation to fully or partially overcome a vision defect or as an ophthalmologist, optometrist, optician, or other vision care professional preparing a HMD for use by a patient. A "vision defect" as used herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the HMD in an application other than for the purposes of ameliorating physical vision defects. Said applications could include, but are not necessarily limited to gaming, augmented reality, night vision, computer use, viewing movies, environment simulation, etc. Augmented reality applications may include, but are not limited to, medicine, visual assistance, engineering, aviation, tactical, gaming, sports, virtual reality, environment simulation, and data display.

An "aberration" or "optical aberration" as used herein and through this disclosure refers to, but is not limited to, a degradation and/or distortion imparted to an optical image by one or more optical elements individually or in combination such that the performance of the one or more optical elements individually or in combination departs from the performance predictions of paraxial optics. This includes, but is not limited to, monochromatic aberrations such as piston, tilt, defocus, spherical aberration, coma, astigmatism, field curvature, and image distortion. This includes, but is not limited to, chromatic dispersion, axial chromatic aberrations, and lateral chromatic aberrations.

1. Bioptic Head Mounted Displays

Within the prior art head mounted displays (HMDs) have typically been geared to immersive use, e.g. the user sees only the images projected onto the display or towards augmented reality wherein the user views the real world and is presented additional information through the HMD. Examples of the former immersive HMDs include Oculus Gear™ 1010 by Oculus™ in conjunction with Samsung™, the HMZ-T3 W 1020 by Sony™, and the Virtual Research (VR) 1280 1030 by Panou™ as depicted in FIG. 1A. In the latter augmented reality category are devices such as Recon Jet™ 1040 by Recon™, Google Glass 1050 by Google, and Moverio™ BT-200 1060 by Epson™, also depicted in FIG. 1A. In the former immersive HMDs, the user views the display directly or displays directly and exclusively, whilst in the latter the user views the additional information as an overlay presented in addition to the user's native vision through a typically smaller display projected onto a smaller region of the user's retina.

All of these systems involve an optical train comprising at least the display and pupil of the user. Except in the most basic HMD system with just these two elements then additional optical elements are disposed within the optical train. These optical elements may include, but not limited to, corrective prescription glasses, contact lenses, a camera acquiring an image for display to the user, and one or more lenses and/or prisms disposed within the optical train. Accordingly, aberrations such as distortions and chromatic effects will require consideration and addressing in order to provide an optimal visual stimulus to the user. For example, within systems that place the displays in front of the user's eyes such as Oculus Gear™ 1010 then a pair of lenses provide slightly different views of the same display to the user to trigger depth perception whilst the Sony HMZ-T3 W exploits a pair of lenses disposed between the user's pupils and the two display screens. In contrast, the Moverio™ BT-200 1060 in common with HMDs accordingly established by the inventors at eSight Inc. exploit projection optics through which the user views the world and onto which the augmented images and/or augmentation content are projected from optical displays mounted in the sides of the HMD such as with the Moverio™ BT-200 and eSight™ Generation 3 HMD or in the upper portion of the HMD projecting down such as with the Generation 1 and Generation 2 HMD from eSight™. Other side mounted displays exploit a variety of optical elements to re-direct the optical path from display to eye including, but not limited to, curved mirror (e.g., Vuzix™), diffractive waveguide (e.g. Nokia™ and Vuzix™), holographic waveguide (e.g. Sony and Konica-Minolta), polarized waveguides (e.g. Lumus), and reflective waveguides (e.g. Epson, Google, eSight).

Figure 1B:
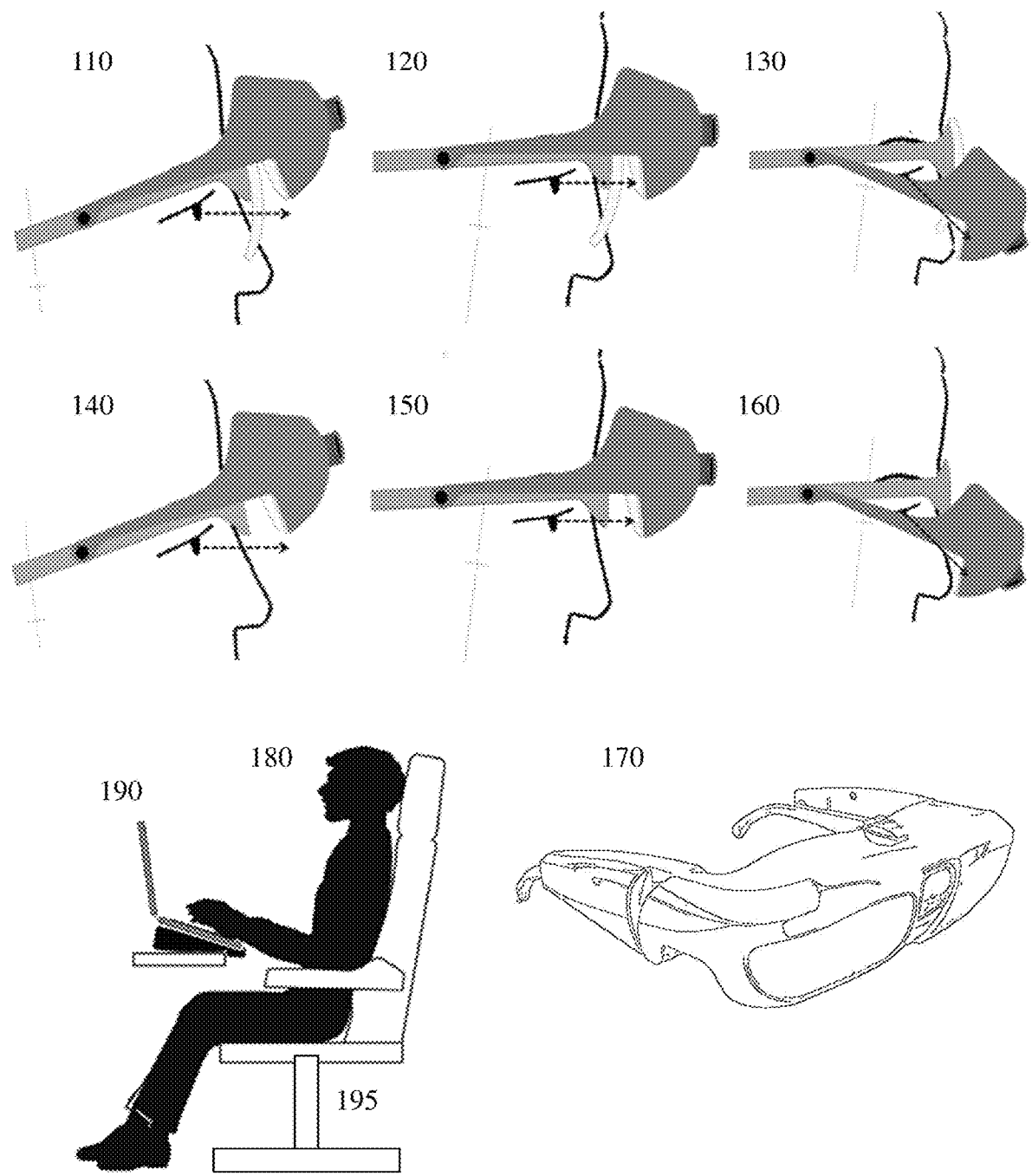
FIG. 1B depicts a bioptic head mounted device according to the prior art supporting embodiments of the invention.

The eSight™ HMDs support the users with and without refractive correction lenses as depicted in FIG. 1B. There being shown by first to third schematics 110 to 130 respectively in the instance of corrective lenses and fourth to sixth schematics 140 to 160 respectively without lenses. Accordingly, a user 180 working with a laptop computer 190 would typically be sitting with their head in orientations depicted in second, third, fifth, or sixth schematic 120, 130, 150 and 160 respectively wherein the HMD is engaged. In this instance the laptop computer 190 may establish a direct WPAN or wired link to the HMD 170 thereby displaying the images to the user which would otherwise be displayed on the screen of the laptop computer. In some instances, the laptop computer, due to typically increased processing resources compared to HMD 170 or a PED to which the HMD 170 is connected, may have software in execution thereon to take over processing from the HMD 170 or PED. If the user tilts their head backwards with a weighted HMD bioptic system, then the HMD pivots out of the way as depicted in first and third schematics 110 and 140 respectively. Optionally, the HMD is manually pivoted out of the user's line of sight but they may still view the display by glancing upwards. In the third and sixth schematics 130 and 160 the user has tilted their head forward to view something wherein the camera within the HMD may tilt and/or zoom to provide a different viewpoint. Accordingly, in the different configurations the user may view the HMD itself in different orientations either directly without refractive correction lenses or through different regions of their refractive correction lenses.

2. HMD and Partnered Device Configuration

Figure 2:
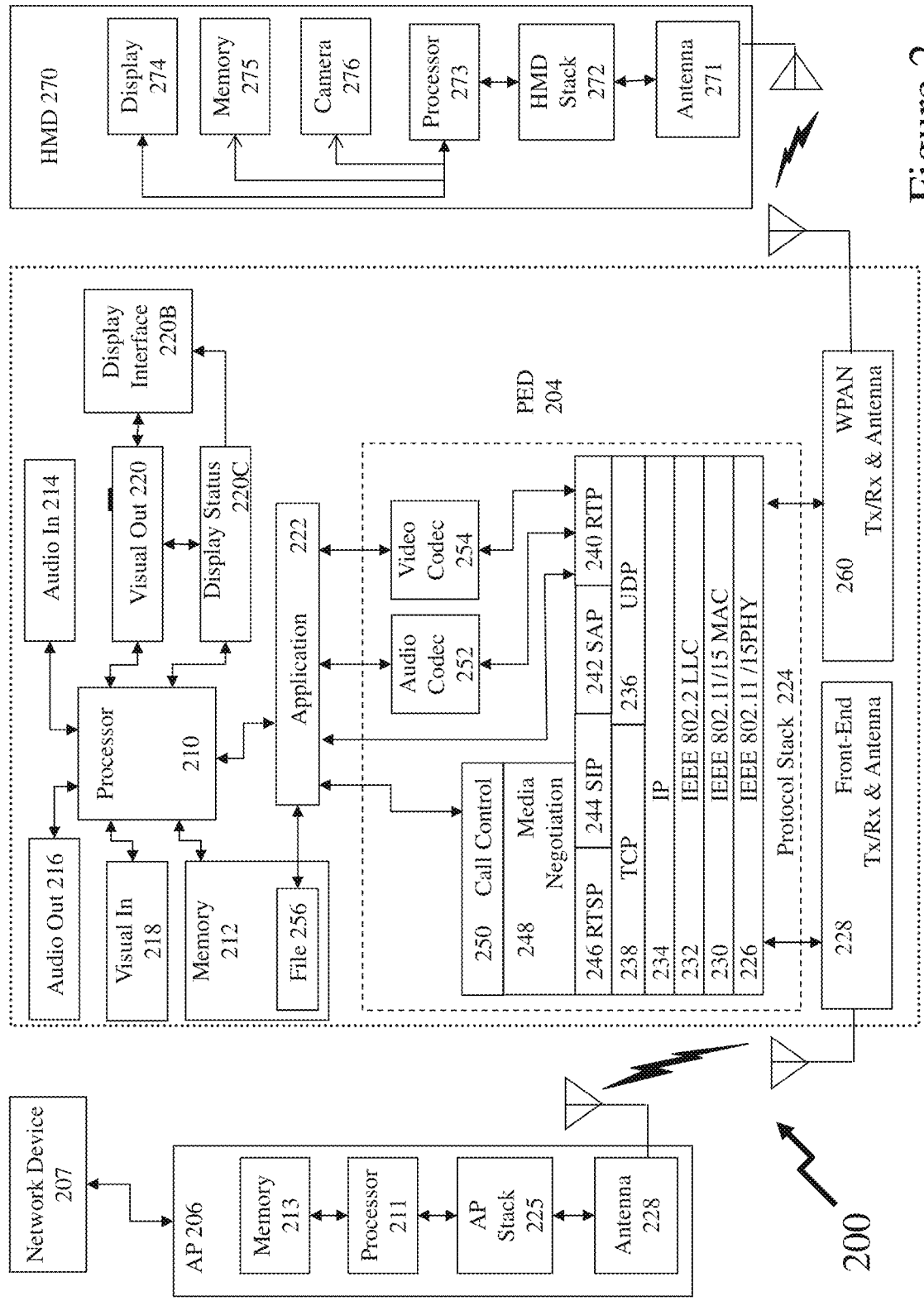
FIG. 2 depicts a portable electronic device supporting a head mounted device according to an embodiment of the invention.

Referring to FIG. 2 there is depicted a portable electronic device 204 supporting an interface to a HMD 270 according to an embodiment of the invention. Also depicted within the PED 204 is the protocol architecture as part of a simplified functional diagram of a system 200 that includes a portable electronic device (PED) 204, such as a smartphone, an access point (AP) 206, such as first Wi-Fi AP 110, and one or more network devices 207, such as communication servers, streaming media servers, and routers for example. Network devices 207 may be coupled to AP 206 via any combination of networks, wired, wireless and/or optical communication. The PED 204 includes one or more processors 210 and a memory 212 coupled to processor(s) 210. AP 206 also includes one or more processors 211 and a memory 213 coupled to processor(s) 211. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.@

PED 204 may include an audio input element 214, for example a microphone, and an audio output element 216, for example, a speaker, coupled to any of processors 210. PED 204 may include a video input element 218, for example, a video camera, and a visual output element 220, for example an LCD display, coupled to any of processors 210. The visual output element 220 is also coupled to display interface 220B and display status 220C. PED 204 includes one or more applications 222 that are typically stored in memory 212 and are executable by any combination of processors 210. PED 204 includes a protocol stack 224 and AP 206 includes a communication stack 225. Within system 200 protocol stack 224 is shown as IEEE 802.11/15 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11/15-compatible PHY module 226 that is coupled to one or more Front-End Tx/Rx & Antenna 228, an IEEE 802.11/15-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Also shown is WPAN Tx/Rx & Antenna 260, for example supporting IEEE 802.15.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the PED 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Also depicted is HMD 270 which is coupled to the PED 204 through WPAN interface between Antenna 271 and WPAN Tx/Rx & Antenna 260. Antenna 271 is connected to HMD Stack 272 and therein to processor 273. Processor 273 is coupled to camera 276, memory 275, and display 274. HMD 270 being for example HMD 370 described above in respect of FIG. 11. Accordingly, HMD 270 may, for example, utilize the processor 210 within PED 204 for processing functionality such that a lower power processor 273 is deployed within HMD 270 controlling acquisition of image data from camera 276 and presentation of modified image data to user via display 274 with instruction sets and some algorithms for example stored within the memory 275. It would be evident that data relating to the particular individual's visual defects may be stored within memory 212 of PED 204 and/or memory 275 of HMD 270. This information may be remotely transferred to the PED 204 and/or HMD 270 from a remote system such as an optometry system characterising the individual's visual defects via Network Device 207 and AP 206. For example, the eSight Generation 3 HMD supports a wired USB connection to the PED/FED as well as a Bluetooth connection. Accordingly, a Wi-Fi connection to the HMD 270 would be via the PED/FED and either the Bluetooth or wired connection.

Optionally, the processing of image data may be solely within the HMD 270, solely within the PED 204, distributed between them, capable of executed independently upon both, or dynamically allocated according to constraints such as processor loading, battery status etc. Accordingly, the image acquired from a camera associated with the HMD 270 may be processed by the HMD 270 directly but image data to be displayed acquired from an external source processed by the PED 204 for combination with that provided by the HMD 270 or in replacement thereof. Optionally, processing within the HMD 270 may be offloaded to the PED 204 during instances of low battery of the HMD 270, for example, wherein the user may also be advised to make an electrical connection between the HMD 270 and PED 204 in order to remove power drain from the Bluetooth interface or another local PAN etc.

Accordingly, it would be evident to one skilled the art that the HMD with associated PED may accordingly download original software and/or revisions for a variety of functions including diagnostics, display image generation, and image processing algorithms as well as revised ophthalmic data relating to the individual's eye or eyes. Accordingly, it is possible to conceive of a single generic HMD being manufactured that is then configured to the individual through software and patient ophthalmic data. Optionally, the elements of the PED required for network interfacing via a wireless network (where implemented), HMD interfacing through a WPAN protocol, processor, etc. may be implemented in a discrete standalone PED as opposed to exploiting a consumer PED. A PED such as described in respect of FIG. 2 allows the user to adapt the algorithms employed through selection from internal memory as well as define an ROI through a touchscreen, touchpad, or keypad interface for example.

Further the user interface on the PED may be context aware such that the user is provided with different interfaces, software options, and configurations for example based upon factors including but not limited to cellular tower accessed, Wi-Fi/WiMAX transceiver connection, GPS location, and local associated devices. Accordingly, the HMD may be reconfigured upon the determined context of the user based upon the PED determined context. Optionally, the HMD may determine the context itself based upon any of the preceding techniques where such features are part of the HMD configuration as well as based upon processing the received image from the camera. For example, the HMD configuration for the user wherein the context is sitting watching television based upon processing the image from the camera may be different to that determined when the user is reading, walking, driving etc. In some instances, the determined context may be overridden by the user such as, for example, the HMD associates with the Bluetooth interface of the user's vehicle but in this instance the user is a passenger rather than the driver.

It would be evident to one skilled in the art that in some circumstances the user may elect to load a different image processing algorithm and/or HMD application as opposed to those provided with the HMD. For example, a third party vendor may offer an algorithm not offered by the HMD vendor or the HMD vendor may approve third party vendors to develop algorithms addressing particular requirements. For example, a third party vendor may develop an information sign set for the Japan, China etc. whereas another third party vendor may provide this for Europe.

Optionally the HMD can also present visual content to the user which has been sourced from an electronic device, such as a television, computer display, multimedia player, gaming console, personal video recorder (PVR), or cable network set-top box for example. This electronic content may be transmitted wirelessly for example to the HMD directly or via a PED to which the HMD is interfaced. Alternatively, the electronic content may be sourced through a wired interface such as USB, I2C, RS485, etc. as discussed above. In the instances that the sourced from an electronic device, such as a television, computer display, multimedia player, gaming console, personal video recorder (PVR), or cable network set-top box for example then the configuration of the HMD may be common to multiple electronic devices and their "normal" world engagement or the configuration of the HMD for their "normal" world engagement and the electronic devices may be different. These differences may for example be different processing variable values for a common algorithm or it may be different algorithms.

3. Depth Mapping

Figure 3:
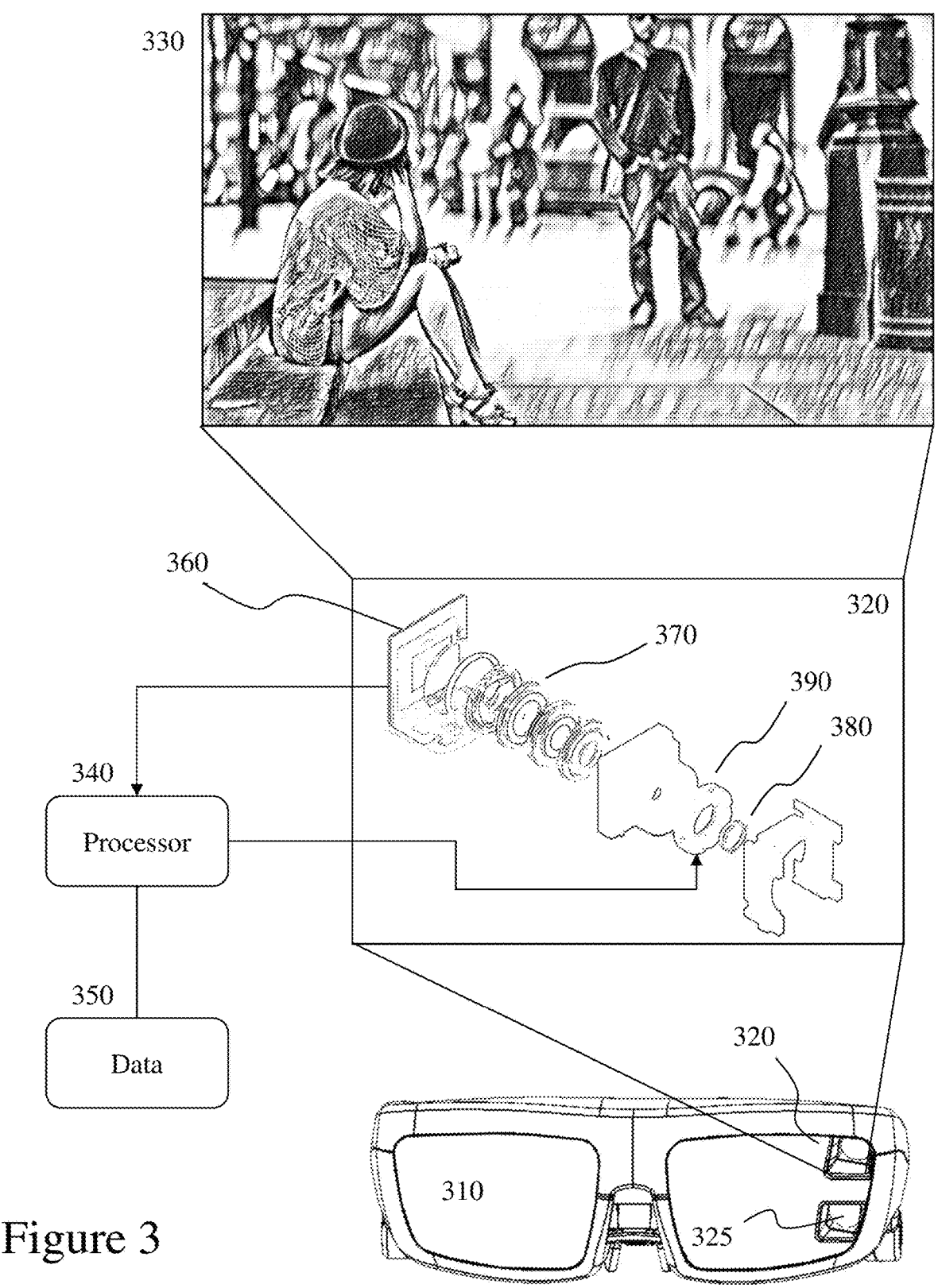
FIG. 3 depicts a schematic diagram of a system configured in accordance with an embodiment of the invention.

Now referring to FIG. 3 there is depicted a schematic diagram of a system configured in accordance with an embodiment of the present invention. The HMD system 310 receives light from the external environment 330 into a camera system 320 that images the object light onto a sensor array 360. The camera system 320 being schematically depicted in exploded form and comprising an objective lens set 380 and a pupil lens 370 that are movable relative to each other to adjust focus of the camera system 320. For example, the pupil lens 370 may be mounted to a microelectromechanical system (MEMS) 390 although it would be evident to one of skill in the art that the number of optical elements, their arrangement, etc. within the camera system 320 may be varied without departing from the scope of the invention. Similarly, other electro-mechanical means of adjusting the relative positioning of optical elements within the camera system 320 may be employed discretely, in combinations thereof, and in combination with MEMS. These may include piezoelectric elements, stepper motors, inchworm drives, rotational drive translation stages and linear translation stages. The MEMS 390 is connected to a microprocessor based control circuit 340 which provides control signals to adjust the MEMS 390 and therein the spacing of optical elements within the camera system 320. Also coupled to the control circuit 340 are the sensor array 360 and a memory 350.

Sensor array 360 may utilize a. variety of components including, but not limited to, photoelectric sensors that generate electrical energy in response to receiving light within predetermined wavelength ranges through filters, such as long (e.g. red), medium (e.g. green), or short (e.g. blue) wavelength light. Such sensor arrays 360 including those based upon charge-coupled devices (CCDs), for example, that generate electrical currents for each element or "pixel" in accordance with the intensity of light it receives after the wavelength filter. Combining red (R), green (G), and blue (B) pixels adjacent to each other provides for a colour camera system 320.

Measurements of the electrical current from each of the sensors of the sensor array 106 are provided to a control circuit 340 for computation. The control circuit 340 utilizes focus error data, described further below, that is read from a memory 350, such as a digital random access memory (RAM). The control circuit 340 determines the sign and magnitude of the focus error in the received image, in accordance with its processing based on the data in the memory 350, and determines the focus error of the received image. Exemplary process flows being described and depicted in respect of FIGS. 4 and 5. Employing the process flow described and depicted in respect of FIG. 4 the control circuit 340 can compensate for the determined focus error by adjusting the camera system 320 to implement the compensating directional sign (e.g., either back focus or front focus) and compensating magnitude such that the received image is substantially in focus at the sensor array 360. That is, based on one set of received image data from the sensor array, the control circuit 340 can calculate the adjustment to the camera system 320 that will be required to bring the received image into focus in one actuation of the optical system. The optical path through the optical system is a direct optical path, in the sense that the optical path from the external environment 330 to the sensor array 360 is a path that is not interrupted with intervening structures that disperse the collected light. Such structures including, for example, filters, beam splitters, etc. and accordingly, an iterative focus technique of prior art contrast focus systems is avoided, and the complicated optical path and prisms of phase detection focus systems are not needed.

Figure 4:
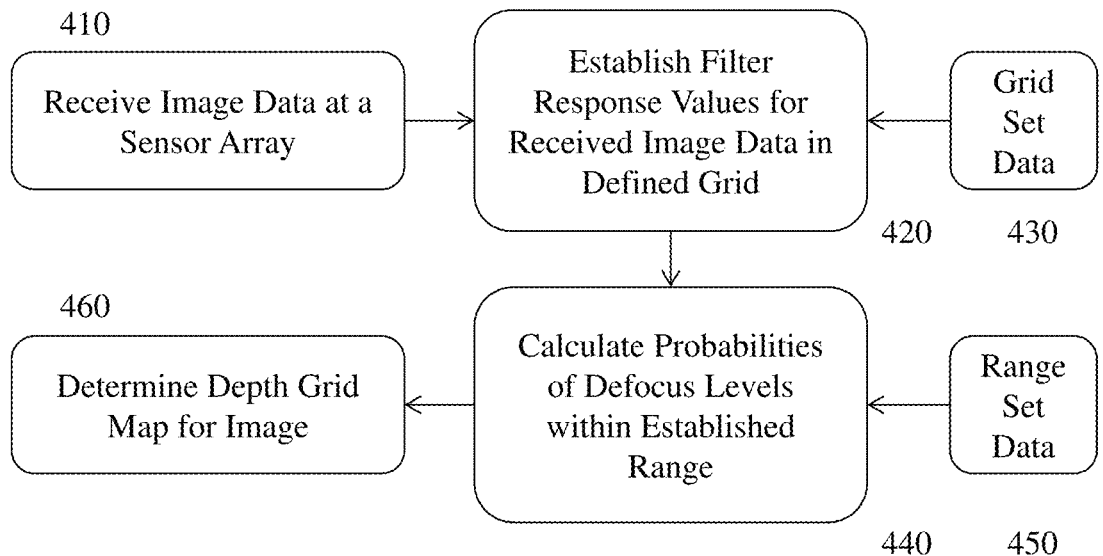
FIGS. 4 and 5 depict exemplary process flows for acquiring image content, establishing defocus information and/or depth mapping according to embodiments of the invention.

Now referring to FIG. 4 there is depicted a process flow relating to the operations for determining focus error within an image which is acquired with a digital image sensor such as sensor array 360 in FIG. 3. As depicted the process comprises first to fourth steps 410, 420, 440, and 460, these being:

First step 410, wherein image data is received at the sensor array through the optical system from the external environment and employed in generating image data for each pixel of the sensor array;

Second step 420, wherein filter response values of the received image data are calculated for each of one or more defocus filters for the optical system within each grid element of a grid established in dependence of grid setting data acquired from a grid set 430 stored within a memory.

Third step 430 wherein in estimating the focus error for each grid element the control circuit now calculates a probability for each possible defocus level within a defined range established in dependence upon range setting data 450 retrieved from the memory.

Fourth step 440 wherein for each grid element within the grid a specified range is determined from the observed filter response vectors thereby generating a depth grid map for the acquired image.

In executing step 440 standard techniques may be employed to obtain optimal estimates of focus error from the probability distribution, such as minimum mean-squared error (MMSE) or maximum a posteriori (MAP) estimates for example. The focus error can be determined in order to provide both the sign (direction) of the focus error and the magnitude of the focus error. This is possible by processing two or more sensor arrays rather than one sensor array. As a colour sensor array includes either pixels that are colour sensitive inherently or through the use of wavelength filters then this sensor array may be considered as three arrays, e.g. red, green, blue, or four arrays in some with red, green, yellow, blue. Accordingly, if the sign of the focus error is to be estimated, the filters will process image data from at least two of these multiple sensor channels, selected arbitrarily or selected preferentially. If only the magnitude is to be estimated, the filters will process data from one or more of the sensor channels. Where a user is colour blind then the channels may be selected for optimal focus for their particular colour blindness whereas a user with no colour blindness may be pre-configured for red-blue channels so that the extremes of the visual response are processed or the combination may be varied in dependence upon environmental factors such as natural versus artificial lighting, type of artificial lighting, night-day, time of day, latitude, etc.

Within the process flow described and depicted in respect of FIG. 4 the defocus of a target image region is defined as the difference between the current optical power, $P_{CURRENT}$ of the lens system and the required optical power, $P_{RE-}$ $_{QUIRED}$ to bring the target region into focus, i.e. $P_{CORR}=P_{CURRENT}-P_{REQUIRED}$, $P_{CORR}$ therefore, being the focus error for the region of the image. In respect of the process flow described and depicted in respect of FIG. 4 then the acquired image, $I_{ACQUIRED}$ is broken into a grid of elements X×Y and accordingly required optical power is a matrix of value, $P_{REQUIRED}$ [X, Y]. If we consider an idealized image, $I_{IDEAL}$, which is M×N pixels then with the association of each pixel within a sensor to a wavelength range, λ, then a point source in the image acquired will be spread by a spreading function relating to the degradations present within the optical system between the image being acquired and the optical sensor. Defining this spreading function as $\Im_{SPREAD}$ then assuming circular symmetry this is a function of position from the ideal location, x, wavelength, λ, the optical system degradations, Θ, and the de-focusing due to incorrect focus of the optical system, ΔD which is defined as a deviation in distance of the focal plane from the sensor. Accordingly, $\Im_{SPREAD}=\Im_{SPREAD}$ (x, λ, Θ, ΔD) The optical system degradations, Θ, can be expanded into a series of factors relating to system characteristics such as the objective lens 380 that are dependent upon longitudinal position (where the objective lens 380 is moveable relative to the optical sensor 360) and those that are dependent upon de-focusing as the optical degradations vary with the degree of filling of the pupil lens set 370, for example. As such we can re-write as $\Im_{SPREAD}=\Im_{SPREAD}(x, λ, Θ, ΔD)=\Im_{SPREAD}(x, λ, ΔD)\aleph(z)\Re(z, λ, ΔD)$ where $\aleph(z)$ represents longitudinal position dependent spreading and $\Re(z, λ, ΔD)$ that relating to the optical aberrations. Accordingly, a set of randomly selected well-focused, e.g. sharp, image segments, e.g. portions of an image or images, are collected for an optical system. These image segments are then defocused with each point-spread function for each defocus level within a range of defocus levels.

These defocused image segments are then convolved with the response of the sensor array which is represented by a wavelength sensitivity function and a spatial sampling function for each sensor, i.e. red, green, or blue. Additionally, a noise function may be included in the computations. This noise function may, for example, be a random value for noise to be added as a simulation for noise level in the optical system, such as in noise in the response of the sensors in the optical system or their digitizing electronics etc. Accordingly, from the simulations for each defocus level an optical defocus transfer function is generated which is then used within the process described in respect of FIGS. 4 and 5 to derive the defocus level for each captured image or segment of the image.

Figure 5:
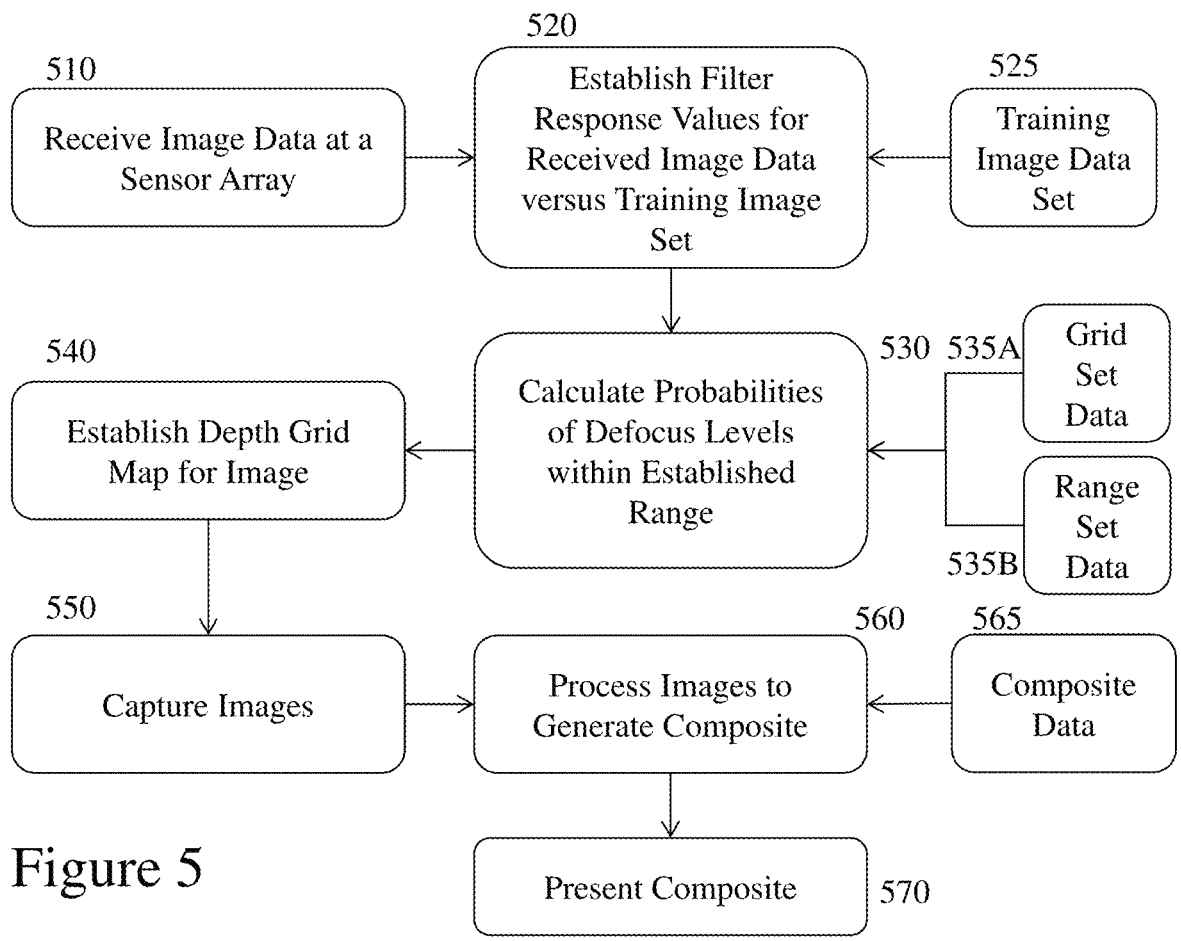

Now referring to FIG. 5 there is depicted a corresponding process flow for the operation of a focus error estimation technique as applied to a device through the use of a grid to define multiple regions of an image and a training set of images. As depicted the process comprises first to seventh steps 510 to 570, wherein these comprise:

First step 510 wherein an image receiving process is initiated on a device such as, for example, on a HMD at initialization of the HMD, power on, periodically, or at user determined instant.

Second step 520 wherein the user is prompted to view a series of training images 525 and trigger acquisition or otherwise indicate the next image is being viewed. Optionally, within other embodiments of the invention a training image may be acquired in use.

Third step 530 wherein the estimated focus error in the received image(s) is established using a technique such as described below and/or in respect of FIG. 4 for the grid. This third step 530 may employ data from memory relating to a range setting, range set data 535B, and implementing a grid for multiple focus depths across the image, grid set data 535A, in order to limit the range over which the process executes and divide the display into a plurality of regions although the grid set data may define the grid as 1×1, i.e. a single element.

Fourth step 540 wherein once the focus error(s) are determined the depth grid for the image is derived.

Fifth image 550 wherein the system captures multiple images over a range of focal depths, where the range of depths may be predetermined or derived in dependence upon the depth grid data.

Sixth image 560 wherein the multiple images captured in step 550 are processed to generate a composite image, with optional composite data set 565.

Seventh step 570 wherein the generated composite is presented to the user.

It would be evident that the training image set 525 may be presented to the user on a PED/FED or within an ophthalmic environment. These may, for example, be discrete black or white dots on an inverse background, discrete coloured dots to define for example red training images and blue training images, a particular image wherein content within the image is isolated and processed. For example, an archery range may be presented visually to the user wherein a cross-hair is employed for deriving filter responses.

The range set data 535B and the grid set data 535A may be established based upon a variety of factors including but not limited to the orientation of the user's head and/or the image being viewed. For example, referring to FIG. 1B, in third and sixth schematics 130 and 160 respectively relate to the user tiling their head forward and working on something in front of them, generally, and hence the default range set for this may be narrow and close. In second and fifth schematics 120 and 150 respectively the user is viewing "normally" and accordingly the range may be according to the situation anything from narrow and close, e.g. sitting watching television, or wide and large as the viewer is looking down a street with objects close and far or viewing a landscape with trees or other objects nearby and far.

Composite data set 565 may define how images within a composite are to be combined at their boundaries, for example, in order to avoid sharp transitions. For example, the boundary between grid elements may be a combination of the two adjacent grid elements or that some grid elements, e.g. the periphery should be gray toned upon combination whereas others are in colour.

Figure 6:
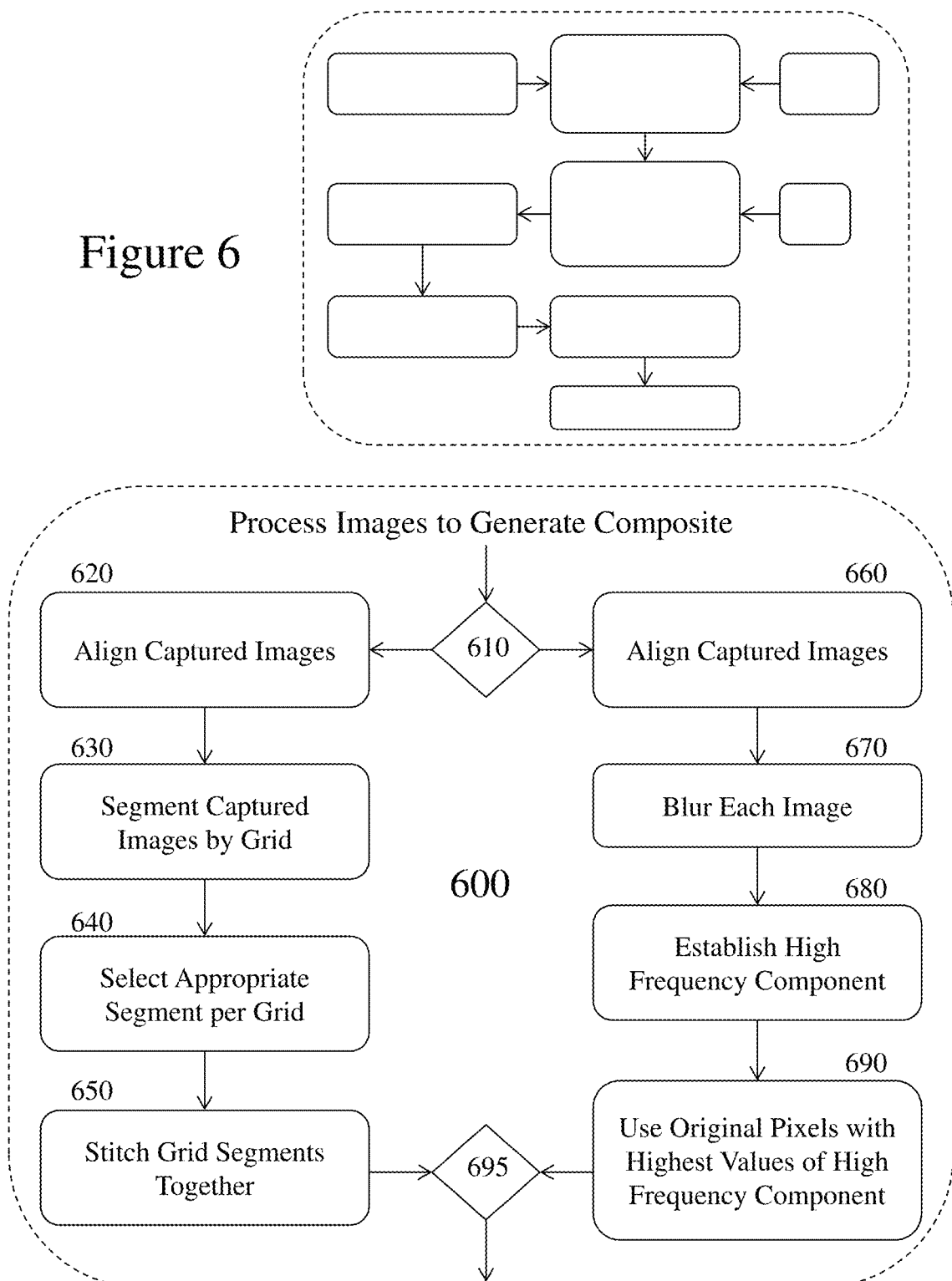
FIG. 6 depicts an exemplary process flow for compositing image content to generate an image for presented to a user in accordance with an embodiment of the invention.

Now referring to FIG. 6 there is depicted an exemplary process flow 600 for step 570 in FIG. 5. This process flow 600 starting at step 610 and ending at step 695 relates to the compositing of the multiple images and comprising first to eighth steps 620 to 690 respectively wherein first to fourth steps 620 to 650 respectively relate to a stitching process whereas fifth to eight steps 660 to 690 respectively relate to a merging of content. Accordingly, first to fourth steps 620 to 650 respectively comprise:

First step 620 wherein the multiple images are aligned to reflect that the user may be in motion and/or their head in motion during the acquisition phase of the multiple images;

Second step 630 wherein the captured images are segmented according to the grid established from the grid data set;

Third step 640 wherein the appropriate segments from each image for each grid are extracted; and Fourth step 650 wherein the grid segments are stitched together to form the final image being presented to the user.

Figure 7:
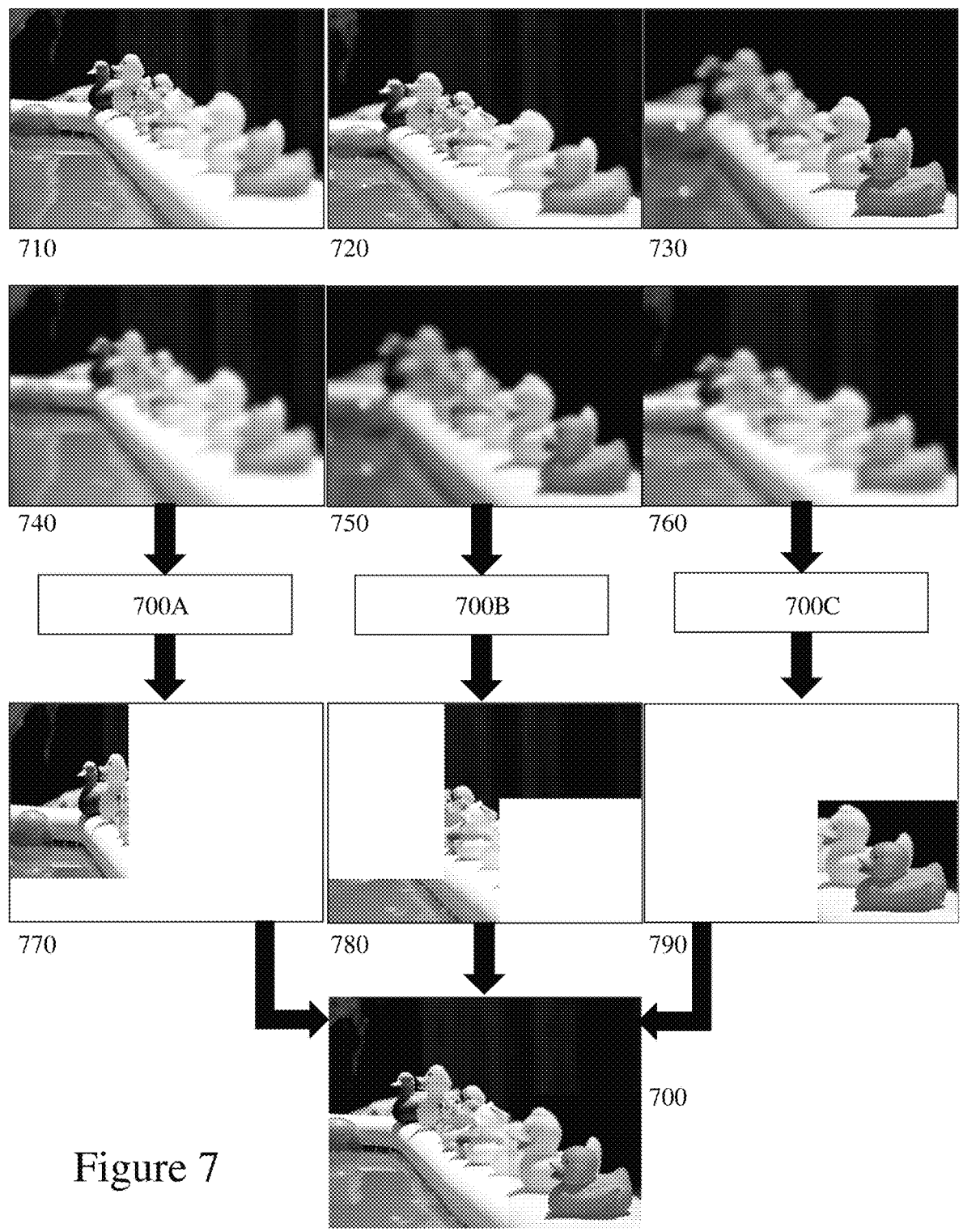
FIG. 7 depicts pictorially an exemplary process flow for compositing image content to generate an image for presented to a user in accordance with an embodiment of the invention.

In contrast fifth to eighth steps 660 to 690 respectively comprise:

Fifth step 650 wherein the multiple images are aligned to reflect that the user may be in motion and/or their head in motion during the acquisition phase of the multiple images;

Sixth step 670 wherein each image is blurred to reduce high frequency content and establish a modified image of low frequency content;

Seventh step 680 wherein the modified image is subtracted from the original image yielding a second modified image which has the high frequency content of the original image, which would typically be the content most in focus; and Eighth step 690 wherein the image to be presented is generated by taking the pixels in any of the second modified images with the highest value for the high frequency component so that the content with highest "in focus" content is selected such that the resulting image Accordingly, with an image acquisition system having a fast frame rate and an optical lens system providing fast adjustment, for example using a fast motor, MEMS, or liquid lens, then multiple images can be acquired at a high rate, processed and employed within the embodiments of the invention described in respect of FIGS. 3 through 6 respectively. Referring to FIG. 7 an example of compositing using fifth to eighth steps 650 to 690 respectively is depicted simplistically wherein first to third images 710 to 730 were acquired using a fast acquisition system with fast lens adjustment. Accordingly, there are blurred as depicted by fourth to sixth images 740 to 760 wherein these are subtracted from the first to third images 710 to 730 respectively yielding first to third modified images 700A to 700C. These are then processed to extract the pixels with highest values for the high frequency content yielding first to third high frequency images 700A to 700C respectively. Then the pixels with the highest values of the highest frequency content are derived which as depicted is performed per image to generate first to third filtered images 770 to 790 which are then combined to generate final image 700 for presentation to the user. Within FIG. 7 these are simply depicted as well defined regions of the image but in reality would typically be with arbitrary shapes and combining pixels from multiple images at the boundaries between content extracted from each in focus image region. Optionally, the final image 700 may be simply generated directly from the values within the first to third high frequency images 700A to 700C respectively and their associated original images 710 to 730 respectively.

Optionally, the methods described supra in respect of FIGS. 4 to 7 may be augmented and/or replaced by other depth mapping methods according to embodiments of the invention including but not limited to, infrared depth mapping wherein an infrared (IR) grid may be projected from an infrared emitter within sensor 325 within the HMD as depicted. The resulting IR grid is then read with an IR sensor to establish depth. Such IR techniques may have limited to environments where the user is viewing items that are close or may be triggered based upon the user's head position, location information, etc. Optionally, a pair of cameras within the HMD may be deployed and the images processed to derive parallax based depth information similar to the user's human vision system. Optionally, phase detection as implemented within some CCD based sensor devices may be employed.

Optionally, the user's location in combination with image processing of the image acquired may be employed to derive a depth map or an initial estimate of a depth map to define a range such as employed in defining a range of camera focusing described in FIG. 5.

Optionally, embodiments of the invention may include object recognition to associate elements within the image to objects and highlighting the identified objects based upon their depth (distance).

Optionally, embodiments of the invention may include moving the location of an objected identified within the acquired image data within the resulting image provided to the user.

Optionally, embodiments of the invention may include establishing content within the image having a depth below a predetermined threshold or above a predetermined threshold.

Optionally, content identified with the image and/or having a depth meeting a predetermined criterion or criteria may be modified wherein the modification may be one or more of:

modifying the predetermined portion comprises at least one of:
applying a predetermined image processing algorithm to the predetermined portion;
applying a predetermined spectral adjustment to the predetermined portion;
applying a predetermined temporal adjustment to the predetermined portion;
applying a predetermined spatial adjustment to the predetermined portion;
applying a blurring process to the predetermined portion; and
replacing the predetermined portion with a correlated predetermined portion of another image acquired with a different depth of focus.

Optionally, the system may provide an output to the user in dependence upon processing an acquired image in conjunction with a depth map where the output is not visually presented to the user by modifying the image. Rather the output is one or more of a tactile output, a visual output, and an audible output. The output or an aspect of the output may be established in dependence upon a depth of content within the processed image associated with triggering the output.

According to embodiments of the invention the HMD may use hardware components including image sensors, lenses, prisms and other optical components, and video displays, that mimic the inherent performance of human vision in terms of visual and cognitive spatial acuity, visual and cognitive spectral response or sensitivity to color and contrast, and visual and cognitive temporal response or sensitivity to difference in visual information from one moment in time to the next. Examples of this biomimicry could include components that have higher resolution and better color representation in the center of the field of view, and relaxed resolution and color representation, but faster refresh performance at the extremities of the field of view, thereby mimicking the natural performance characteristics of human vision.

Figure 8:
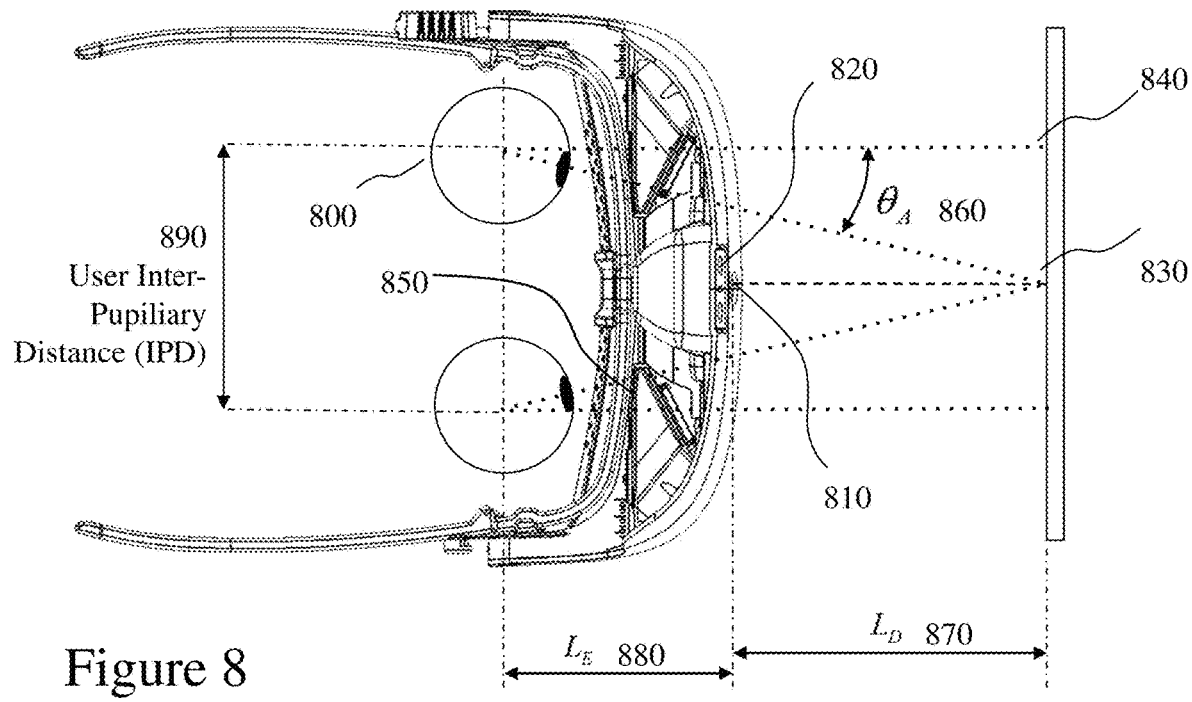
FIG. 8 depicts a top elevation view of a near-to-eye (NR2I) system depicting the effect and compensation for angular offset with varying distance of a centered viewed object with a centrally disposed rangefinder.

Now referring to FIG. 8 there is depicted the scenario when a healthy, un-aided human eye 800 focuses at a centered, far distant objects 840 (i.e. "at infinity" as commonly referred to). The eyeball shape is adjusted to bring focus to infinity, and the angle $\theta_A$ 860 of the two eyes are controlled such that the pupils are facing directly ahead, i.e. the eyes are in a parallel orientation, and $\theta_A=0$. As the object of interest moves closer towards the user, two effects occur. One is that the eyeball shape is adjusted to bring the focal-depth in from infinity to match the distance to the object, and the second is that the eyeballs are rotated towards each other so that each eyeball is aligned with the object of interest, and the eyes are no longer in a parallel position. In the limit, the user is cross-eyed staring at the bridge of their nose, and the inter-pupil distance (IPD) 890 has reduced substantially as the eyes gaze turned inwards. Typical NR2I systems provide the image at a fixed focal depth of infinity, and the IPD of the images are fixed, which may result in diplopia (double-vision) or eye-strain when viewing close objects, as the eyes are not operating in a "natural" manner for close objects. Improved usability can be achieved if the electronic IPD adjustment is made dynamic, and according to the distance of the object being viewed. For NR2I systems employing a built-in camera, the auto-focus features of the image capture system may be used to direct the digital image processing system to laterally translate the images inwards towards the nose as the focus decreases from infinity. This dynamic IPD display can more accurately mimic real-world conditions and behaviours, reducing eyestrain and improving usability.

The function that relates distance to the object to the number of pixels by which to digitally offset the image may be simple or complex. Again referring to FIG. 8, a simple example might be to take distance information from either a depth-map derived from image data or the rangefinder 820, and for distances $L_D$ 870 less than some threshold T to laterally translate the left and right image pixels towards each other by a function of $L_D$ 870 and T, f(T,D), until a second, minimum, distance threshold is reached.

A more complex example might be to consider the geometry of the situation as follows in order to take advantage of the small angle approximations $\sin(x) \approx x$, and $\cos(x) \approx 1$ for small x. Suppose the width of the display areas 850 is covered by a micro-display of P pixels in width, achieving a horizontal field-of-view angle of V degrees. The small-angle approximation here is that there are P/V pixels per degree of viewing angle. Assuming a centered object 830, the tangent of the eye-angle $\theta_A$ 860 to the object 830 is half the user IPD 890 divided by the distance from the centre of the user's eye to the rangefinder, $L_E$ 880 plus the distance from the rangefinder to the object $L_D$ 870 as given by Equation (5). In this manner, the number of pixels to shift may be given by either Equation (6) or (7) for example where f(*) might be the identity function or alternatively may be one of a number of functions that threshold, limit, scale, etc.

$$\theta_A = \arctan\left(\frac{IPD}{(2 \times (L_D + L_E))}\right) \quad (5)$$

$$\text{Pixels\_to\_Shift} = A \times \frac{P}{V} \quad (6)$$

$$\text{Pixels\_to\_Shift} = f\left(A \times \frac{P}{V}\right) \quad (7)$$

Figure 9:
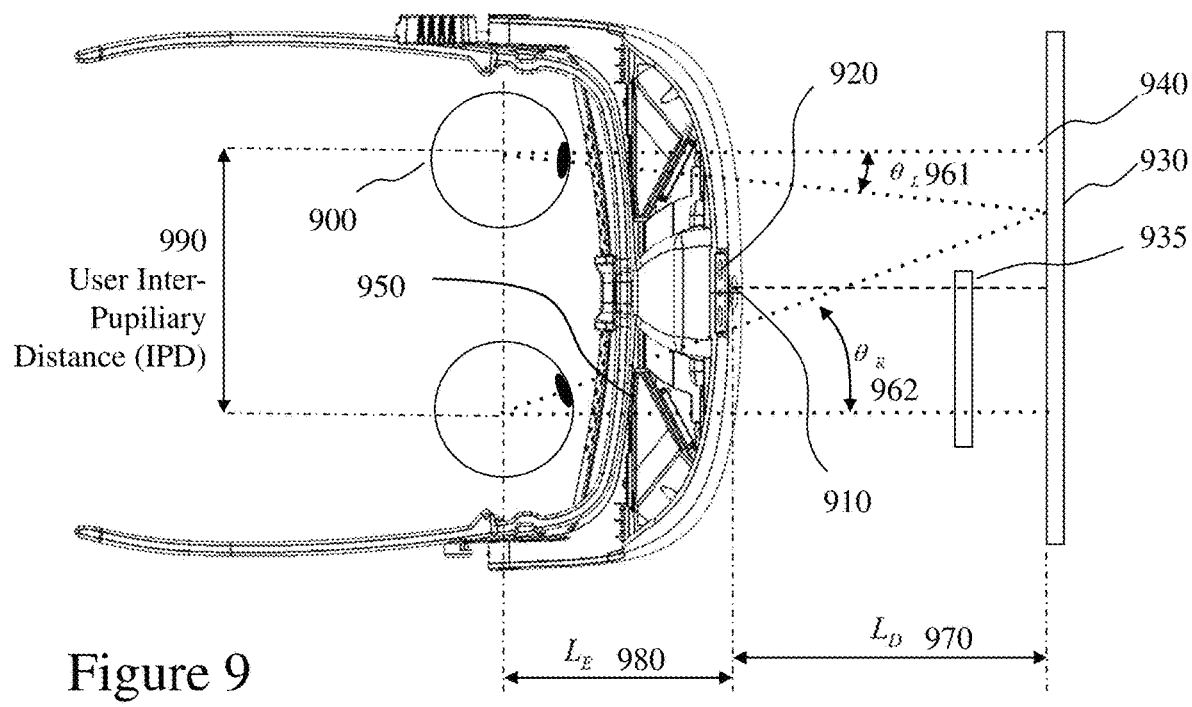
FIG. 9 depicts a top elevation view of a NR2I system depicting the effect and compensation for angular offset with varying distance of an off-centered viewed object with a centrally disposed rangefinder.

More complex examples still might consider off-centered objects, as shown in FIG. 9. In such cases although the user's eyes 900 are focused on an off-center object 930 the central rangefinder 920 will measure the depth to the centered object 935. Gaze-tracking implemented with any of a variety of mechanisms (for example using additional imaging devices directed towards the user's eyeball or eyeballs) may be employed to allow an improved image to be displayed. First, by employing both a depth-map derived from the image-data, in combination with the location within the image to which the user's gaze is directed through gaze-tracking, as well as the current focal depth, then the system may derive the difference in depth between where the camera is currently focused versus where the user is gazing, and thus issue a focusing command to bring the gazed-at object into improved focus. Secondly, as the object is now no longer centered in the horizontal field of view, each eye's rotation assumes a different angle, shown as $\theta_L$ 961 for the left eye and $\theta_R$ 962 for the right eye.

Analogous to the symmetric case above, a lateral image-shift may now be computed independently for each of the left and right displays such that each eye perceives the image of the object being gazed-at in the correct location for an object at that depth and offset from centre being viewed in the absence of the near-to-eye HMD system, and thus making the image appear more natural to the user. Further, the combination of a central range finder 920 and image-based depth-mapping also allows periodic or continuous calibration of the image-derived depth map at the central field of view as measured by the rangefinder.

In a manner similar to that described for the horizontal direction, both eye tracking data and the range to the object of gaze may be used to then shift the left and right display images symmetrically or asymmetrically, and/or independently for left and right eyes, and/or in the vertical orientation as well, the displays dynamically responding to the location of the user's gaze. A means for performing such shifting of image content before presentation to the user is described in detail within U.S. Provisional Patent Application 62/150,911 entitled "Methods and Devices for Optical Aberration Correction," the contents of which are incorporated herein by reference.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of augmenting a user's vision comprising:
providing the user of a head mounted display system with an augmented image to the user comprising augmented image data which is established in dependence upon acquired image data relating to the user's field of view and processing the acquired image data to generate the augmented image data in dependence upon a depth parameter established by the head mounted display; wherein
the head mounted display system includes a fast camera for rapidly capturing a plurality of acquired images, each acquired image within the plurality of acquired images being defocused relative to the focal plane of a sensor within the camera by a different amount; and the augmented image is generated in part by processing the plurality of acquired images to establish a presentation image with unlimited depth of field; wherein processing the plurality of acquired images comprises:
generating for each acquired image of the plurality of acquired images a first modified image comprising only low frequency content of the acquired image;
generating for each acquired image a second modified image based upon subtracting the first modified image from the acquired image; and
composing the presentation image for presentation from the plurality of acquired images based upon selecting the content within them associated with those regions within the plurality of second images having a highest value.

2. The method according to claim 1, wherein either:
the depth parameter is established in dependence upon data from a range finder associated with at least one of the user and the head mounted display;
or:
the depth parameter is established in dependence upon depth data derived from processing the acquired image data either discretely or as one set of acquired data within a plurality of sets of acquired data.

3. The method according to claim 1, wherein either:
processing the acquired image data to generate the augmented image data comprises shifting the acquired image data upon the head mounted display system in dependence upon a mathematical function defining the shift versus the depth parameter;
or:
processing the acquired image data to generate the augmented image data comprises shifting the acquired image data upon the head mounted display system in dependence upon both a mathematical function defining the shift versus the depth parameter and a factor established in dependence of a gaze tracker tracking the direction of the user's gaze.

4. The method according to claim 1, wherein
processing the acquired image data to generate the augmented image data comprises shifting the acquired image data upon the head mounted display system in dependence upon a mathematical function defining the shift versus the depth parameter; wherein
the depth parameter is modified in dependence upon a direction of the user's gaze.

5. The method according to claim 1, wherein
at least one of processing the acquired image data to generate the augmented image data and establishing the depth parameter comprises at least the steps of:
defining a plurality of regions within the acquired image data; and
establishing a depth map for the plurality of regions within the acquired digital image in dependence upon processing the acquired image data within each region of the plurality of regions to establish defocusing data and deriving a depth in dependence upon the defocusing data.

6. The method according to claim 1, wherein
at least one of processing the acquired image data to generate the augmented image data and establishing the depth parameter comprises at least the steps of:
defining a plurality of regions within image content acquired by an image acquisition system;
establishing for each region of the plurality of regions a defocus statistic which is calculated based on a characterization of the image acquisition system; and
defining a depth map for the plurality of regions by deriving a plurality of depths in dependence upon the defocusing statistics for the plurality of regions.

7. The method according to claim 6, wherein
the defocus statistic for each region of the plurality of regions is established in dependence upon splitting the image content acquired by the image acquisition system into a plurality of image sets, each image set associated with a predetermined wavelength range of the visible spectrum.

8. The method according to claim 1, wherein
processing the plurality of acquired images comprises:
defining within each acquired image regions having a defocusing below a predetermined threshold; and
composing the presentation image for presentation from the images regions in each image having the defocusing below the predetermined threshold.

9. The method according to claim 1, further comprising modifying the generated augmented image data by at least one of:
applying a predetermined image processing algorithm to a predetermined portion;
applying a predetermined spectral adjustment to a predetermined portion;
applying a predetermined temporal adjustment to a predetermined portion;
applying a predetermined spatial adjustment to a predetermined portion;
applying a blurring process to a predetermined portion; and
replacing a predetermined portion with a correlated predetermined portion of another image acquired with a different depth of focus.

10. The method according to claim 1, further comprising
establishing a depth map for an image to be or being presented to a user;
processing the image to be or being presented to the user in dependence upon the depth map; and
generating an output in dependence upon the processed image which is not visually presented to the user by modifying the image.

11. The method according to claim 10, wherein
the output is at least one of a tactile output, a visual output, and an audible output.

12. The method according to claim 10, wherein
an aspect of the output is established in dependence upon a depth of content within the processed image associated with triggering the output.

13. The method according to claim 1, wherein either:
processing the acquired image data to generate the augmented image data comprises shifting the acquired image data upon the head mounted display system in dependence upon a mathematical function defining the shift versus the depth parameter;
or:
processing the acquired image data to generate the augmented image data comprises shifting the acquired image data upon the head mounted display system in dependence upon both a mathematical function defining the shift versus the depth parameter and a factor established in dependence of a gaze tracker tracking the direction of the user's gaze.

14. A method of augmenting a user's vision comprising:

providing the user of a head mounted display system with an augmented image to the user comprising augmented image data which is established in dependence upon acquired image data relating to the user's field of view and processing the acquired image data to generate the augmented image data in dependence upon a depth parameter established by the head mounted display; wherein the head mounted display system includes a fast camera for rapidly capturing a plurality of acquired images, each acquired image within the plurality of acquired images being defocused relative to the focal plane of a sensor within the camera by a different amount; and the augmented image is generated in part by processing the plurality of acquired images to establish a presentation image with unlimited depth of field; wherein processing the plurality of acquired images comprises:

establishing a grid defining a plurality of regions for each acquired image in the plurality of acquired images;

processing the plurality of acquired images to define a defocusing error within each region of the plurality of regions for each acquired image of the plurality of acquired images;

defining for each region of the plurality of regions the acquired image of the plurality of acquired images having the lowest defocusing error; and composing a presentation image for presentation to the user by selecting for each region within the plurality of regions the image content from the acquired image of the plurality of acquired images having the lowest defocusing error.

15. The method according to claim 14, wherein
either:

the depth parameter is established in dependence upon data from a range finder associated with at least one of the user and the head mounted display;

or:

the depth parameter is established in dependence upon depth data derived from processing the acquired image data either discretely or as one set of acquired data within a plurality of sets of acquired data.

16. The method according to claim 14, wherein processing the acquired image data to generate the augmented image data comprises shifting the acquired image data upon the head mounted display system in dependence upon a mathematical function defining the shift versus the depth parameter; wherein the depth parameter is modified in dependence upon a direction of the user's gaze.

17. The method according to claim 14, wherein at least one of processing the acquired image data to generate the augmented image data and establishing the depth parameter comprises at least the steps of:

defining a plurality of regions within the acquired image data; and establishing a depth map for the plurality of regions within the acquired digital image in dependence upon processing the acquired image data within each region of the plurality of regions to establish defocusing data and deriving a depth in dependence upon the defocusing data.

18. The method according to claim 14, wherein at least one of processing the acquired image data to generate the augmented image data and establishing the depth parameter comprises at least the steps of:

defining a plurality of regions within image content acquired by an image acquisition system;

establishing for each region of the plurality of regions a defocus statistic which is calculated based on a characterization of the image acquisition system; and defining a depth map for the plurality of regions by deriving a plurality of depths in dependence upon the defocusing statistics for the plurality of regions.

19. The method according to claim 14, wherein processing the plurality of acquired images comprises:

defining within each acquired image regions having a defocusing below a predetermined threshold; and composing the presentation image for presentation from the images regions in each image having the defocusing below the predetermined threshold.

20. The method according to claim 14, further comprising modifying the generated augmented image data by at least one of:

applying a predetermined image processing algorithm to a predetermined portion;

applying a predetermined spectral adjustment to a predetermined portion;

applying a predetermined temporal adjustment to a predetermined portion;

applying a predetermined spatial adjustment to a predetermined portion;

applying a blurring process to a predetermined portion; and replacing a predetermined portion with a correlated predetermined portion of another image acquired with a different depth of focus.

21. The method according to claim 14, further comprising establishing a depth map for an image to be or being presented to a user;

processing the image to be or being presented to the user in dependence upon the depth map; and generating an output in dependence upon the processed image which is not visually presented to the user by modifying the image.

\* \* \* \* \*